United States Patent [19]

Van Zon et al.

[11] Patent Number: 5,147,570
[45] Date of Patent: Sep. 15, 1992

[54] PROCESS FOR PREPARING A DISPERSANT/VI IMPROVER AND PRODUCT PREPARED THEREFROM

[75] Inventors: Arie Van Zon; Gerarda J. Klaver, both of Amsterdam, Netherlands

[73] Assignee: Shell Oil Company, Houston, Tex.

[21] Appl. No.: 672,995

[22] Filed: Mar. 21, 1991

[30] Foreign Application Priority Data

Mar. 30, 1990 [GB] United Kingdom ............... 9007267

[51] Int. Cl.$^5$ ........................................... C10M 149/00
[52] U.S. Cl. .......................... 252/51.5 A; 252/56 R; 525/192; 525/193; 525/285; 525/301; 525/384; 525/385
[58] Field of Search ............ 252/51.5 A, 56 R; 525/192, 193, 384, 385

[56] References Cited

U.S. PATENT DOCUMENTS 4,077,893  3/1978  Kiovsky .................. 252/56 R
4,409,120  10/1983  Martin .................. 252/51.5 R
5,049,294  9/1991  Van Zon et al. ............. 252/56 R

*Primary Examiner*—Ellen McAvoy
*Attorney, Agent, or Firm*—James O. Okorafor

[57] ABSTRACT

Dispersant/VI improver lubricating oil additives are produced by reacting a star polymer with an alpha, beta unsaturated carboxylic acid or derivative to form an activated star polymer, which is then reacted with (a) at least one compound of general formula $$RO(AO)_nH$$

wherein R is a $C_{4-20}$ alkyl group, A is an independent moiety of either ethylene or propylene, an n is an integer from 0 to 10, optionally followed by reacting with (b) an alkyl carboxylic acid and/or (c) an alkylamine or alkane polyol, or with the preformed product of reactions (b) and (c), optionally followed by esterifying any residual acid groups with a $C_{1-6}$ alkanol.

14 Claims, No Drawings

PROCESS FOR PREPARING A DISPERSANT/VI IMPROVER AND PRODUCT PREPARED THEREFROM

BACKGROUND OF THE INVENTION

This invention relates to modified polymers having useful properties as additives for lubricating oils.

The newer automobile engines place increased demands on the lubricants to be employed. In the past a number of different additives have been added to lubricating oils to improve properties such as viscosity index and dispersancy. One such additive added to lubricating oils to improve viscosity index (VI) is a two-block copolymer having the general configuration A-B where A is styrene and B is hydrogenated isoprene. These copolymer additives are further disclosed in U.S. Pat. Nos. 3,763,044 and 3,722,196, the disclosures which are herein incorporated by reference. A VI improver having greatly improved mechanical shear stability is the selectively hydrogenated star-shaped polymer disclosed in U.K. Patent Specification 1,575,507 the disclosure which is herein incorporated by reference. Employing a single additive that improves a number of lubricant properties can achieve significant reductions in cost, and also circumvent the compatibility problems that can arise between the various additives and/or base oil. However, in attempting to improve more than a single lubricant property, care must be taken in not causing the deterioration of other properties. For example, the use of an oxidation step to attach polar groups to the polymer backbone as taught in U.S. Pat. No. 3,864,268, herein incorporated by reference, leads to reduced lubricant stability by introducing additional sites for oxidative attack.

U.S. Pat. No. 4,077,893, herein incorporated by reference, discloses ashless oil-soluble additives prepared by a process comprising:

(a) reacting a selectively hydrogenated star-shaped polymer with an alpha-beta unsaturated carboxylic acid, anhydride or ester at a temperature of between about 150° C. and about 300° C., for between about 1 hour and about 20 hours wherein said star-shaped polymer comprises a poly (polyalkenyl coupling agent) nucleus, and at least four polymeric arms linked to said nucleus wherein said polymeric arms are selected from the group consisting of:
(i) hydrogenated homopolymers and hydrogenated copolymers of conjugated dienes;
(ii) hydrogenated copolymers of conjugated dienes and monoalkenyl arenes; and
(iii) mixtures thereof;
and wherein at least about 80% of the aliphatic unsaturation of the star-shaped polymer has been reduced by hydrogenation while less than 20% of the aromatic unsaturation has been reduced; and (b) reacting the product of step (a) with an alkane polyol having at least two hydroxy groups at a temperature of between about 150° C. and about 250° C.

EP-A-364 058, herein incorporated by reference, published on Apr. 18, 1990 (Application ref. T 5277 EPC) describes ashless, oil-soluble additives having both dispersant and viscosity-index (VI) improving properties produced by 1) reacting an alpha-beta unsaturated carboxylic acid or active derivative thereof, preferably at a temperature of between about 100° C. and about 300° C. for between about 1 hour and about 24 hours, with a selectively hydrogenated star-shaped polymer comprising a polyvinyl aromatic nucleus and at least 4 polymeric arms e.g. 4-25 arms, which arms each can have a number average molecular weight of e.g. 5,000 to 150,000 and are linked to said nucleus, wherein said polymeric arms are selected from the group consisting of:
(i) hydrogenated homopolymers and hydrogenated copolymers of conjugated dienes;
(ii) hydrogenated copolymers of conjugated dienes and monoalkenyl arenes; and
(iii) mixtures thereof;
and wherein at least 80%, preferably 90 to 98%, of the aliphatic unsaturation of the star-shaped polymer has been reduced by hydrogenation while less than 20% of the aromatic unsaturation has been reduced; and 2) reacting the activated hydrogenated star polymer thus formed with:
a) a long-chain alkane-substituted carboxylic acid or active derivative thereof, and
b) with a $C_1$ to $C_{18}$ amine containing 1 to 8 nitrogen atoms and/or with an alkane polyol having at least two hydroxy groups;

or with c) the preformed product of reactants a) and b).

SUMMARY OF THE INVENTION

According to the present invention there is provided a process for preparing a dispersant/VI improver which comprises 1) reacting an alpha-beta unsaturated carboxylic acid or active derivative thereof with a selectively hydrogenated star-shaped polymer comprising a polyvinylaromatic nucleus having at least 4 polymeric arms linked to said nucleus wherein said polymeric arms are selected from the group consisting of:
(a) hydrogenated homopolymers and hydrogenated copolymers of conjugated dienes;
(b) hydrogenated copolymers of conjugated dienes and monoalkenyl arenes; and
(c) mixtures thereof;
and wherein at least 80% of the aliphatic unsaturation of the star-shaped polymer has been reduced by hydrogenation while less than 20% of the aromatic unsaturation has been reduced; and 2) reacting the activated star polymer thus formed with:
(a) at least one compound of general formula $$RO(AO)_nH \qquad (I)$$

wherein R is a $C_{4-20}$ alkyl group, A is an independent moiety of either ethylene or propylene, and n is an integer from 0 to 10, optionally followed by reacting with (b) a long chain alkane-substituted carboxylic acid or active derivative thereof, and/or (c) a $C_1$ to $C_{18}$ amine containing 1 to 8 nitrogen atoms and/or an alkane polyol having at least two hydroxy groups;

or with (d) the pre-formed product of reactants (b) and (c), optionally followed by esterifying any residual acid groups with a $C_{1-6}$ alkanol. Step 1) above is essentially similar to step 1) of EP-A-364 058.

DETAILED DESCRIPTION OF THE INVENTION

The star polymers employed in making the present dispersant VI improvers are generally produced by the process comprising the following reaction steps:
(i) polymerizing one or more conjugated dienes in solution in the presence of an anionic initiator to form a living polymer;
(ii) reacting the living polymer with a polyvinyl aromatic compound, preferably divinyl benzene, to form a star-shaped polymer; and
(iii) hydrogenating the star-shaped polymer to form a hydrogenated star-shaped polymer.

This preparation is described in detail in UK Patent Specification 1575507, the disclosure of which is herein incorporated by reference.

The living polymers produced in reaction step (i) of the present process are the precursors of the hydrogenated polymer chains which extend outwardly from the polyvinyl aromatic nucleus. Preferably each polymeric arm is a hydrogenated polyisoprene homopolymer.

The molecular weights of the star-shaped polymer to be hydrogenated in reaction step (iii) may vary between relatively wide limits. It is possible to produce star polymers having peak molecular weights of from about 25,000 to about 1,250,000. Preferred molecular weights are from about 100,000 to 500,000. These peak molecular weights are determined by using conventional gel permeation chromatography (GPC) techniques.

In step (iii), the star-shaped polymers are hydrogenated by any suitable technique. Suitably at least 80%, preferably from about 90 to about 98%, of the original olefinic unsaturation is hydrogenated. The amount of aromatic unsaturation which is hydrogenated, if any, will depend on the hydrogenation conditions used. However, preferably less than 20%, more preferably less than 5%, of such aromatic unsaturation is hydrogenated.

The molecular weights of the hydrogenated star-shaped polymers correspond to those of the unhydrogenated star-shaped polymers.

The hydrogenation can be carried out as described in U.K. Patent Specification 1,575,507, a preferred process being the selective hydrogenation process described in U.S. Pat. No. 3,595,942. These disclosures are herein incorporated by reference. In that process, hydrogenation is conducted, preferably in the same solvent in which the polymer was prepared, utilizing a catalyst comprising the reaction product of an aluminium alkyl and a nickel or cobalt carboxylate or alkoxide. A preferred catalyst is the reaction product formed from triethyl aluminium and nickel octoate.

The hydrogenated star-shaped polymer is then recovered in solid form from the solvent in which it is hydrogenated by any convenient technique such as by evaporation of the solvent. Alternatively, an oil, e.g. a lubricating oil, may be added to the solution and the solvent stripped off from the mixture so formed to produce concentrates. Easily handleable concentrates are produced even when the amount of hydrogenated star-shaped polymer therein exceeds 10 wt % of the hydrogenated star-shaped polymer. Suitable concentrates contain from 10 to 25 wt % of the hydrogenated star-shaped polymer.

The selectively hydrogenated star polymers as prepared above do not in themselves have adequate dispersancy characteristics and are modified as explained below:

1) The star polymer is first activated by reaction with an alpha-beta unsaturated carboxylic acid or active derivative thereof. By "active derivative thereof" is meant anhydrides, esters and the like. Suitable unsaturated acids and derivatives include maleic acid, maleic anhydride, itaconic acid, dimethyl itaconate, acrylic acid, ethyl acrylate, methacrylic acid, methyl methacrylate, oleic acid, linoleic acid, etc., with maleic anhydride being especially preferred.

The unsaturated carboxylic compound and the hydrogenated star polymer are suitably reacted together at a temperature of between 100° C. and 300° C., preferably between 130° C. and 250° C. The contacting time may be between 1 hour and 24 hours, preferably between 4 hours and 8 hours. The carboxylic compound reacts with the residual olefinic bonds available on the diene portion of the star polymer, and/or with the radicals initiated on the polymer chain; temperatures between 100° C. and 150° C. being suitable in the latter case.

Various solvents may be employed in the carboxylic acid derivative addition step 1) including generally olefin-free petroleum hydrocarbons, aromatics and halogenated hydrocarbons. A preferred solvent is a lubricating oil basestock. Preferably a concentration in the range of about 1% to about 20% by weight of the copolymer in solvent may conveniently by used for this conversion.

Generally the amount of unsaturated carboxylic compound is in excess over that stoichiometrically necessary to react with all the residual double bonds remaining in the diene portion of the selectively hydrogenated star polymer. Preferably, at least one mol of carboxylic compound is used for each olefinic unsaturation present in the selectively hydrogenated star polymer, with equivalent ratios of carboxylic compound to olefinic double bonds of between 1:1 and 2:1 being particularly suitable. However, less than stoichiometric amounts of carboxylic compound may also be used. Any excess carboxylic compound is typically removed either by vacuum distillation or through the use of a stripping gas stream.

The above reaction may be carried out with or without the use of catalyst or radical initiators such as tert. butyl hydroperoxide or tert. butyl perbenzoate.

2) The activated hydrogenated star polymer resulting from the above reaction with unsaturated carboxylic acid is then modified by reaction with:
(a) at least one compound of general formula

$$RO(AO)_nH \qquad \qquad (I)$$

wherein R is a $C_{4-20}$ alkyl group, A is an independent moiety of either ethylene or propylene, and n is an integer from 0 to 10, optionally followed by reacting with (b) a long-chain alkane-substituted carboxylic acid or active derivative thereof, preferably succinic acid, anhydride or ester, and/or (c) a $C_1$ to $C_{18}$ amine containing 1 to 8 nitrogen atoms and/or with an alkane polyol having at least two hydroxy groups; or (d) the preformed product of reactants (b) and (c), optionally followed by esterifying any residual acid groups with a $C_{1-6}$ alkanol. Reaction of the activated star polymer with the compound of general formula I (reactant (a)) is suitably effected by heating these reactants together, suitably at a temperature between 100° C. and 200° C., preferably between 140° C. and 170° C. Subsequent reactions with an alkane carboxylic acid (reactant (b)), and/or an alkylamine or alkane polyol (reactant (c)), or a pre-formed reaction product of (a) and (b) (reactant (d)) is suitably effected in similar manner to reaction of the activated star polymer with reactant (a), but reactants (b) and (c) may be added in any order or together. Preferably however, when both reactants (b) and (c) are used, reactant (b) is added first. The reaction may be carried out in the presence of a solvent, conveniently the same solvent as that used in the star polymer activating step 1), a lubeoil basestock being particularly convenient for both process steps. It is desirable to operate under an inert atmosphere, suitably nitrogen.

Compounds of formula I are known. It will be appreciated that when n is 0, the compounds of formula I are $C_{4-20}$ alkanols, e.g. n-butanol or a $C_{9-15}$ detergent primary alkanol such as those sold by the Royal Dutch/Shell Group of companies under the "DOBANOL" trade mark, e.g. "DOBANOL 91", "DOBANOL 23", "DOBANOL 25", or "DOBANOL 45". It is preferred, however for n to be in the range of from 2 to 10, more preferably from 3 to 7, most preferably 5. A is preferably an ethylene moiety. R is preferably $C_{9-15}$ alkyl, more preferably $C_{9-11}$ alkyl. Suitable such compounds are "DOBANOL" (trade mark) ethoxylates sold by the Royal Dutch/Shell Group of companies, e.g. "DOBANOL 91-2.5", "DOBANOL 91-6", "DOBANOL 23-6.5", "DOBANOL 25-3", "DOBANOL 25-7", and very conveniently "DOBANOL 91-5".

The molar ratio of the compound of formula I to carboxylic moieties in the activated star polymer product of step is 1) preferably in the range of from about 0.1:1 to about 2:1. Thus, when the alpha-beta unsaturated carboxylic acid or active derivative is maleic anhydride, as is preferred, the molar ratio of the compound of formula I to maleic anhydride groups in the activated star polymer is preferably from about 0.2:1 to 4:1, and is more preferably 0.5:1 to 2:1. In the case where there is no subsequent reaction with any of reactants (b), (c) and (d), the preferred molar ratio of the compound of formula 1 to maleic groups is 0.5:1 to 4:1, more preferably 1:1 to 2:1.

Long-chain alkane-substituted carboxylic acid/derivatives (reactant (b)) are preferably derived by reacting an alpha-beta unsaturated carboxylic acid or active derivative thereof with a polyolefin, suitably a homopolymer or copolymer of one or more olefin monomers having from 2 to 16, preferably from 2 to 6 carbon atoms. The copolymers include random, block and tapered copolymers. Suitable monomers include ethene, propene, butenes, isobutene, pentenes, octenes, and also diolefines such as butadiene and isoprene. If a diene is used as monomer the resulting polymer is preferably hydrogenated to saturate at least 90%, more preferably substantially all unsaturated bonds. It is especially preferred to use a polyolefin substituent derived from polyisobutylene. The number average molecular weight of the polyolefin substituent is suitably not greater than 5000, since molecular weights above 5000 can impair the dispersancy properties of the final products, especially in crankcase lubricants. To reduce the risk of problems, the number average molecular weight is preferably from 700 to 3000. The number average molecular weight (Mn) can easily be determined by vapour pressure osmometry or by gel permeation chromatography with calibration of the polymer, as will be appreciated by those skilled in the art. The weight average molecular weight (Mw) can also be determined by gel permeation chromatography. The quotient Mw/Mn, which is a measure indicating the width of molecular weight distribution, suitably has a value of from 1.5 to 4.0.

The unsaturated acid reacting with the polyolefin may be any of those listed earlier as suitable for activating the hydrogenated star polymer. Particularly preferred is maleic acid or anhydride. With maleic acid/anhydride, the addition of the polyolefin to the unsaturated bonding yields a polyolefin-substituted succinic acid derivative.

The average number of unsaturated carboxylic acid groups per polyolefin moiety is normally between 0.5 and 1.5. This means that some of the polyolefin moieties are connected to more than one succinic group. Preferably, the average number of succinic groups per polyolefin moiety is between 0.9 and 1.1.

The polyolefin-substituted carboxylic acids may be prepared according to established procedures from an alkene having the appropriate molecular weight and an appropriate amount of the unsaturated carboxylic acid or active derivative. Thus, the polyolefin, e.g. polyisobutylene, may be mixed with maleic anhydride and chlorine passed through the mixture, yielding hydrochloric acid and polyolefin-substituted succinic anhydride, as described in e.g. GB-A-949,981. Another method for the preparation of polyolefin substituted succinic anhydride is described in U.S. Pat. No. 3,172,892, according to which a halogenated, in particular chlorinated, polyolefin is reacted with maleic anhydride. These patent disclosures are herein incorporated by reference.

From e.g. NL-A-74 12 057 it is known to prepare hydrocarbon-substituted succinic anhydride by thermally reacting a polyolefin with maleic anhydride, a procedure which may be combined with that of GB-A-949,981, as is illustrated in GB-A-1,440,219 and GB-A-1,543,627. The disclosures of these patents are herein incorporated by reference. The products prepared in this way include compounds in which the polyolefin chain is connected to one or both of the alpha carbon atoms of the succinic group.

$C_1$ to $C_{18}$ amines employed in the instant invention can be branched or unbranched, saturated, aliphatic, primary or secondary amines, containing 1 to 8 nitrogens, preferably mono- or diamines, such as ethylamine, butylamine, sec. butylamine, diethylamine, 3-dimethylamino propylamine etc., but including higher polyamines such as alkylene polyamines, wherein pairs of nitrogen atoms are joined by alkylene groups of 2 to 4 carbon atoms. Thus, polyamines of the formula:

$$NH_2(CH_2)_n\text{—}[NH(CH_2)_n]_m\text{—}NH_2$$

are included where n is 2 to 4 and m is 0 to 6. Examples of such polyamines include tetraethylene pentamine, tripropylene tetramine, triethylene tetramine, diethylene triamine, N-aminoalkyl piperazines, e.g., N-(2-aminoethyl) piperazine, N,N'-di(2-aminoethyl) piperazine, etc. Preferred are diethylene triamine, triethylene tetramine or tetraethylene pentamine, as well as corresponding commercial mixtures such as "Polyamine H", and "Polyamine 500".

Alkane polyols useful in making the esters are alkane polyols having at least two and preferably at least four hydroxy groups such as the trihydroxyalkanes, e.g. ethylene glycol, propylene glycol, polymethylene glycols, trihydroxybutanes, pentanes, hexanes, heptanes, octanes, nonanes, dodecanes, etc., as well as tetrahydroxy alkanes, pentahydroxy alkanes, hexahydroxy alkanes, as well as the sugar alcohols such as erythritol, pentaerythritol, tetritols, pentitols, hexitols, mannitol, sorbitol, glucose and the like. Particularly preferred alcohols are pentaerythritol and mannitol. Especially preferred is pentaerythritol.

The molar ratio of amine or polyol to the balance of the carboxylic compounds taking into account the amount of compound of formula I employed is typically between about 0.1:1 and about 2:1, preferably between about 0.25:1 and about 2:1, most preferably about 0.5:1. The conditions during imide formation or esterification are typically about 150° C. to 250° C. for between about 1 hour to 20 hours.

In the reaction steps of 2) it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

In the event that amine or polyol is employed, and is employed in excess, then it may be desirable to remove the excess. One means of doing this is to first exchange the tri-chlorobenzene solvent for a lube base stock by vacuum distillation, and then add a volume of heptane equal to the volume of oil solution. Then an equal volume of methanol is added and mixed. Two separate layers are therein formed upon settling; one layer comprising predominantly wash solvent and the unreacted amine or polyol, and a second layer comprising predominantly oil, heptane, and the additive product. After separating the wash layer, the volatiles present in the product layer can then be removed by a distillation technique. Alternatively, the excess amine or polyol may be removed under a vacuum or with a stripping gas stream.

In the event that any residual acid groups are to be esterified with a $C_{1-6}$ alkanol, esterification is effected in a known manner, e.g. by addition of the alkanol and a suitable acid, e.g. p-toluenesulphonic acid, at elevated temperature e.g. at reflux temperature. The $C_{1-6}$ alkanol may conveniently be, e.g. methanol, ethanol, n-propanol, isopropanol, or preferably, n-butanol.

The dispersant VI improvers of the present invention possess a useful combination of viscosity improving properties with oxidative stability, mechanical shear stability, and dispersancy. In particular, lubricating oils containing these VI improver/dispersants possess a good combination of thickening efficiency and shear stability at high temperature and also good low temperature viscosity characteristics. A lower amount of the present VI improver/dispersants may be required in order to obtain the required thickening performance, as compared with the prior art VI improvers. Further, the VI improver/dispersants may also possess a superior combination of oxidative shear stability, permanent shear stability, and "temporary shear loss". Temporary shear loss refers to the temporary viscosity loss at high shear stress conditions resulting from the non-Newtonian character of the polymeric VI improvers. Still further, the dispersing capability of the instant polymeric additive is excellent.

The reaction product of this invention can be incorporated in lubricating oil compositions, e.g. automotive crankcase oils, in concentrations e.g. within the range of from about 0.1 to about 15, preferably from about 0.1 to 3, weight percent based on the weight of the total compositions, if desired after treatment with base e.g. sodium hydroxide or, preferably, calcium hydroxide to neutralise any residual undesired acidity. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethyene glycol, etc. When used in gasoline or fuel oil, e.g. diesel fuel, No. 2 fuel oil, etc., an amount of from about 0.001 to 0.5 weight percent, based on the weight of the total composition of the reaction product will be used. Concentrations comprising a minor proportion, e.g. 15 to 45 weight percent, of said reaction product in a major amount of hydrocarbon diluent, e.g. 85 to 55 weight percent mineral lubricating oil, with or without other additives present, can also be prepared for ease of handling.

In the above compositions or concentrates, other conventional additives may also be present, including dyes, pour point depressants, antiwear agents, e.g. tricresyl phosphate, zinc dialkyl dithiophosphates of 3 to 8 carbon atoms, antioxidants such as phenyl-alpha-naphthylamine, tert-octylphenol sulfide, bis-phenols such as 4,4'-methylene bis(3,6-di-tert-butylphenol), viscosity index improvers such as the ethylene-higher olefin copolymer, polymethylacrylates, polyisobutylene, alkyl fumaratevinyl acetate copolymers, and the like, as well as other ashless dispersants or detergents such as overbased sulphonates.

The following examples further detail the various aspects of this invention.

EXAMPLE 1

(a) A concentrate of "SHELLVIS 200" (trade mark of Shell Oil Company) star polymer in "XHVI-6" oil (13.8% m/m) was reacted under stirring with maleic anhydride (MALA) (2% mass/mass (m/m) on star polymer) at 133° C. for 18 hours in the presence of tert. butylperbenzoate, as radical initiator, in a $N_2$-atmosphere (50 ppm $O_2$). The radical initiator was dosed (by pumping) over 41 minutes as a 50% m/m solution in oil.

|  |  | GRAMS | % m/m |  |
|---|---|---|---|---|
| Intake: | "SHELLVIS 200" | 340.94 | 13.66 |  |
|  | MALA | 6.82 | 0.27 | (=2% m/m on starpolymer) |
|  | "Trigonox C" (trade mark) (=75% tert. butylperbenzoate) | 9.21 | 0.37 | (=2% m/m tert. tert. butylperbenzoate on starpolymer) |
|  | "XHVI-oil" | 2138.87 | 85.70 |  |
|  | Total | 2495.84 | 100.0 |  |

The reaction mixture was stripped at 110° C. under high vacuum (0.06 mm Hg, 8Pa) to remove residual non-reacted maleic anhydride.

The maleic anhydride content of the thus obtained VI-improver concentrate was determined by titrating with 0.1 mol/l sodium methoxide solution in methanol, using phenolphthalein as the indicator. The MALA contents of the reaction product after high vacuum stripping was 0.015 mmol/g product. Theoretical MALA-content assuming 100% grafting, would be 0.028 mmol/g. Grafting efficiency was therefore 54%.

(b) 1505.9 g (22.1 mmol grafted MALA content) of the stripped product of step (a) above was reacted under nitrogen with 8.41 g (22.1 mmol) of a blend of $C_{9-11}$ alkanol ethoxylates of mean relative molecular mass 380 and containing 5 mol ethylene oxide/mol ("DOBANOL 91-5" (trade mark) ethoxylate available from the Royal Dutch/Shell Group of companies) by heating the stirred mixture at 150° C. for 1 hour followed by 3 hours at 170° C. The resulting product (concentrate, Product A) contained 13.6% wt star polymer and 0.014 mmol/g acid, using the same titration procedure as in Example 1(a).

A blend of 1.7% wt of Product A in "HVI 60" oil had viscosity at 100° C. of 15.8 mm2/S (ASTM D445). "HVI 60" oil is a bright and clear high viscosity index base oil having viscosity at 100° C. of 4.4 to 4.9 mm²/S (ASTM D445) and minimum flash point 200° C. (ASTM D 92).

EXAMPLE 2

1567.0g (23.0 mmol grafted MALA content) of the stripped product of Example 1(a) was reacted in similar manner to Example 1(b) with 17.5 g (46.1 mmol) of "DOBANOL 91-5" (trade mark) ethoxylate. The resulting product contained 0.0125 mmol/g acid, according to titration as in Example 1(a). In order to achieve exhaustive esterification, 14.1 g (190.5 mmol) n-butanol 3.6 g p-toluenesulphonic acid and 1 liter toluene were added (acid content of resulting mixture 0.009 mmol/g) and the resulting mixture was heated under reflux for 22 hours. The acid content of the mixture was reduced to 0.004 mmol/g. The mixture was then treated with 20 g calcium hydroxide for 1 hour at ambient temperature (20° C.), filtered and evaporated in vacuo at 100° C. to yield a product (concentrate, Product B) containing 13.6% wt star polymer, which was acid-free, according to titration as in Example 1(a).

A blend of 1.7% wt of Product B in "HVI 60" oil had viscosity at 100° C. of 14.9 mm²/S (ASTM D445).

EXAMPLE 3

Samples of Product A, Product B and the commercially available VI-improver "SHELLVIS 200" were blended with a SAE 10w/40 luboil containing 6% wt/wt of an additive package comprising an overbased salicylate detergent, a succinimide ashless dispersant, a zinc-based anti-wear additive and a polymethacrylate pour point depressant. The resulting oil was then evaluated according to the sequence VE (as described in "Sequence VE test procedure", 7th draft dated 19th May, 1988; ASTM Monitoring Center, 4400 5th Avenue Pittsburgh USA).

Results are given in Table I.

TABLE I

| Parameter Sample | % w/w sample | Average Engine Sludge (AES) | VE Test Average Engine Varnish (AEV) | Average Camlobe Wear (ACLW) (um) |
| --- | --- | --- | --- | --- |
| "SHELLVIS 200" | 9.50 | 5.4 | 4.3 | 34.3 |
| "SHELLVIS 200" | 7.64 | 4.5 | 5.0 | 8.0 |
| Product A | 7.48 | 6.3 | 4.3 | 14.0 |
| Product B | 8.10 | 6.7 | 4.1 | 21.6 |
| SG Pass Limit | | 9 (min) | 5.0 (min) | 127 (max) |

The data of Table I shows that the inventive products A and B exhibit better Average Engine Sludge performances (6.3 and 6.7 respectively) than commercially available "SHELLVIS 200" products. These results support the assertion that products prepared by the process of this invention have improved dispersant/VI improving properties.

While this invention has been described in detail for the purpose of illustration, it is not to be construed as limited thereby but is intended to cover all changes and modifications within the spirit and scope thereof.

That which is claimed is:

1. A process for preparing a dispersant/VI improver which comprises
   1) reacting an alpha-beta unsaturated carboxylic acid or active derivative thereof with a selectively hydrogenated star-shaped polymer comprising a polyvinylaromatic nucleus having at least 4 polymeric arms linked to said nucleus, wherein said polymeric arms are selected from the group consisting of:
      (i) hydrogenated homopolymers and hydrogenated copolymers of conjugated dienes;
      (ii) hydrogenated copolymers of conjugated dienes and monoalkenyl arenes; and
      (iii) mixtures thereof; and wherein at least 80% of the aliphatic unsaturation of the star-shaped polymer has been reduced by hydrogenation while less than 20% of the aromatic unsaturation has been reduced; and
   2) reacting the activated star polymer thus formed with:
      (a) at least one compound of general formula $$RO(AO)_nH \qquad (I)$$

wherein R is a $C_{4-20}$ alkyl group, A is an independent moiety of either ethylene or propylene, and n is an integer from 2 to 10 followed by reaction with
      (b) a long chain alkane-substituted carboxylic acid or active derivative thereof, and/or (c) a $C_1$ to $C_8$ amine containing 1 to 8 nitrogen atoms and/or an alkane polyol having at least two hydroxy groups; or with (d) the pre-formed product of reactants (b) and (c).

2. A process as in claim 1, further comprising esterifying residual acid groups of the product of claim 1 with a $C_1$ to $C_6$ alkanol.

3. A process as in claim 1 wherein the number of polymeric arms is from about 4 to about 25, and the polyvinyl aromatic compound is divinyl benzene.

4. A process as in claim 1 wherein, in the star polymer, the number average molecular weight of each polymeric arm is from about 5,000 to 150,000, and the peak molecular weight of the hydrogenated star-shaped polymer is from about 25,000 to 1,250,000.

5. A process as in claim 1 wherein the star polymer and carboxylic acid or active derivative thereof are reacted at a temperature in the range of from about 130° C. to 250° C.

6. A process as in claim 1 wherein R in formula I is $C_{9-15}$ alkyl.

7. A process as in claim 1 wherein A in formula I is an ethylene moiety.

8. A process as in claim 1 wherein n in formula I is from about 3 to 7.

9. A process as in claim 1 wherein R in formula I is a $C_{9-11}$ alkyl.

10. A process as in claim 1 wherein the alpha-beta unsaturated carboxylic acid or active derivative thereof is maleic anhydride.

11. A process as claimed in claim 9 wherein the molar ratio of compound of formula I to maleic anhydride groups in the activated star polymer is in the range of about 0.2:1 to 4:1.

12. A process as in claim 9 wherein the molar ratio of compound of formula I to maleic anhydride groups in the activated star polymer is from about 1:1 to 2:1.

13. An ashless, oil-soluble dispersant/VI improver prepared by the process of claim 1.

14. A lubricating composition comprising a major amount of a lubricating oil and a minor amount of the dispersant/VI improver of claim 12.

* * * * *